United States Patent [19]

Oki

[11] Patent Number: 5,072,628
[45] Date of Patent: Dec. 17, 1991

[54] MULTI FUNCTION STEERING MECHANISM FOR A MOTOR VEHICLE

[76] Inventor: T. Jack Oki, 96 Banbury Rd., Don Mills, Ontario M3B 2L3, Canada

[21] Appl. No.: 549,640

[22] Filed: Jul. 6, 1990

Related U.S. Application Data

[63] Continuation-in-part of Ser. No. 409,425, Sep. 19, 1989, abandoned.

[51] Int. Cl.$^5$ .............................................. B62D 7/00
[52] U.S. Cl. .................................................. 74/484 R
[58] Field of Search ............ 74/484 R, 498; 280/731; 200/61.54, 61.57

[56] References Cited

U.S. PATENT DOCUMENTS

| | | | |
|---|---|---|---|
| 3,543,874 | 12/1970 | Nevett | 74/498 X |
| 4,429,588 | 2/1984 | Edmundts et al. | 74/484 R |
| 4,598,602 | 7/1986 | Kurata et al. | 74/484 R |
| 4,604,912 | 8/1986 | Sugita et al. | 200/61.54 X |
| 4,698,838 | 10/1987 | Ishikawa | 379/58 |
| 4,729,254 | 3/1988 | Nogami et al. | 74/484 R |
| 4,771,650 | 9/1988 | Kerner | 74/421 R |
| 4,884,823 | 12/1989 | Honda | 280/731 |
| 4,960,292 | 10/1990 | Sadler | 280/731 |

FOREIGN PATENT DOCUMENTS

| | | | |
|---|---|---|---|
| 54-02531 | 2/1979 | Japan | 74/484 R |
| 1-148640 | 12/1989 | Japan | 74/484 R |

*Primary Examiner*—Leslie A. Braun
*Assistant Examiner*—Ryan W. Massey
*Attorney, Agent, or Firm*—Jane Parsons & Associates

[57] ABSTRACT

The invention concerns a multi function steering mechanism having a non-rotatable display panel located within the rim of the steering wheel. Wires of a wiring truss to the display panel are continuous through a hollow non-rotatable support member for the display panel. A rotatably steering link is off set from the support shaft and geared to a cylindrical gear hub of the steering wheel which is rotatably supported on either the support column or onto an outer housing for the mechanism. The support member, steering link and wheel, with or without the actual display panel, may be provided as a replacement unit for a conventionally mounted steering wheel.

9 Claims, 5 Drawing Sheets

MULTI FUNCTION STEERING MECHANISM FOR A MOTOR VEHICLE

This invention is a continuation-in-part of patent application Ser. No. 409,425 filed Sept. 19, 1989, now abandoned.

BACKGROUND OF THE INVENTION

1. Field of the Invention

This invention relates to a multi function steering mechanism for a motor vehicle and conversion kits for providing such multi function mechanism.

2. Background of the Invention

For a considerable period it has been the practice to mount control devices for various functions on a conventional steering column. There is, however, a practical limit to the number of manually actuable switches which may be conveniently disposed on the steering column.

Attempts have been made to dispose such switches on the steering wheel itself. The vehicle horn has, for example, been disposed centrally in the steering wheel when it is not disposed on a column projecting therefrom. When only one such device is used, or even more than one device, conventional slip rings and wiper devices such as that disclosed in U.S. Pat. No. 4,157,854 issued June 12, 1979 to Beauch may be used to convey electricity between the non-rotatable support column and the rotatable steering shaft on wheel for each device. When more than a very few switches are to be used, each controlling a different function, the slip ring arrangement becomes impracticable due to the limit on the number of slip rings which may be disposed between the steering wheel and the support column.

Since non-rotatable display panels within the periphery of the steering wheel are very desirable both from a design point of view and for practicality, numerous attempts have been made to solve the problems presented. The solutions provided have generally been electrically complex and sophisticated.

For example, U.S. Pat. No. 4,616,224 issued Oct. 7th, 1986 to Reighard discloses a transmitter/receiver pair to convey information relative to the operation of devices between the steering wheel and the support column; U.S. Pat. No. 4,456,903 issued June 26th, 1984 to Kishi et al discloses an optical signal transmission system; U.S. Pat. No. 4,438,425 issued Mar. 20th, 1984 to Tsuchida et al and U.S. Pat. No. 4,321,474 issued Mar. 23, 1982 to Tanaka et al discloses multiplexing signals from switches on the steering wheel and a light emitting device to generate a signal in response to the multiplexed output signal, a decoder unit being provided to decode the output signal of the light emitting device; and U.S. Pat. No. 4,635,029 issued Jan. 6th, 1987 to Yamada again utilizes light to transmit information between a stationary unit and a control board mounted on a steering wheel, light emitting and receiving means being provided on each of the statutory unit and the control board. Such electrical systems may be complex, expensive and sophisticated.

Willet, in U.S. Pat. No. 3,548,128 patented Dec. 15, 1970 discloses a steering wheel having a stationary central display which may be wired directly without the need for sophisticated pick ups from the electrical signals. Willets arrangement includes a central stationary stub carrying the wiring and an outer coaxial tube carrying the steering wheel and rotatable around the central stub.

Edmundts et al, in U.S. Pat. No. 4,429,588 patented Feb. 7, 1984 also discloses a steering wheel having a stationary central display which may be wired directly Edmundts' arrangement necessitates the axis of the steering wheel being offset from the axis of the steering column..

Various mechanical devices may be utilized to maintain a display panel central of the steering wheel non-rotatable with respect thereto. U.S. Pat. No. 4,368,454, for example, discloses one such system.

An attempt has now been made to devise a simple mechanical system utilizing direct connection of wiring to a non-rotatable display Panel within the periphery of the steering wheel, with a view to providing an inexpensive robust alternative to the various remotely operated systems referred to, and also with a view to providing improvements over the mechanical devices of Willet and Edmunts et al.

SUMMARY OF THE INVENTION

Thus, accordingly, the invention provides, in a motor vehicle, including a display console, comprising: a rotatable steering wheel spaced from and operatively linked to a steering shaft through an offset rotatable link whereby the axis of rotation of the steering wheel is aligned with the steering shaft; a non-rotatable, hollow support member located between the steering wheel and the steering shaft; a display panel non-rotatably connected to the support member having a front display face located within the periphery of the steering wheel; a wiring truss within the support member, individual wires of which wiring truss are directly connected to individual units of the display panel.

The offset link may be rotatably supported on the support member and the steering wheel may be journalled for rotation on the support member through inner or outer surfaces of a cylindrical hub.

The support member to hold the display panel stationary may comprise a fixed column which may be tubular to house the wiring truss at least over part of its length. The display panel may include a recess to house an air bag in a collapsed state, the air bag being inflatable by activating means to inflate to emerge from the recess. The inflated air bag may act to prevent the driver falling forward in the event of a crash. The rotatable steering wheel member may comprise a cylindrical hub, an inner surface of which is journalled on the column for rotation.

The offset link may comprise a multi function steering mechanism in which the rotatable steering wheel includes a cylindrical hub, an outer surface of which is journalled on the support member for rotation.

The gearing may comprise gear wheels axial with the offset link rod and meshing respectively with gearing on the inner or outer surface of the cylindrical hub and with gearing on the steering shaft.

The invention may provide a simple conversion kit for use in a motor vehicle originally provided with a conventional steering wheel wheel or a conventional steering shaft. In this case the steering wheel, support member and offset link may be provided as a replacement unit. The conventional steering wheel may be removed and the replacement unit substituted therefor. In this case, it may be advantageous that the linkage between the offset link and the steering shaft be as simple as possible although there is not structural reason why various gearing arrangements should not be interposed between the offset link and the steering shaft. It may, however, be more convenient to provide any step up or step down gearing between the offset link and the steering wheel.

BRIEF DESCRIPTION OF THE DRAWINGS

Embodiments of the invention will now be described by way of example with reference to the drawings, in which.

DETAILED DESCRIPTION OF PREFERRED EMBODIMENTS

Figure 2:
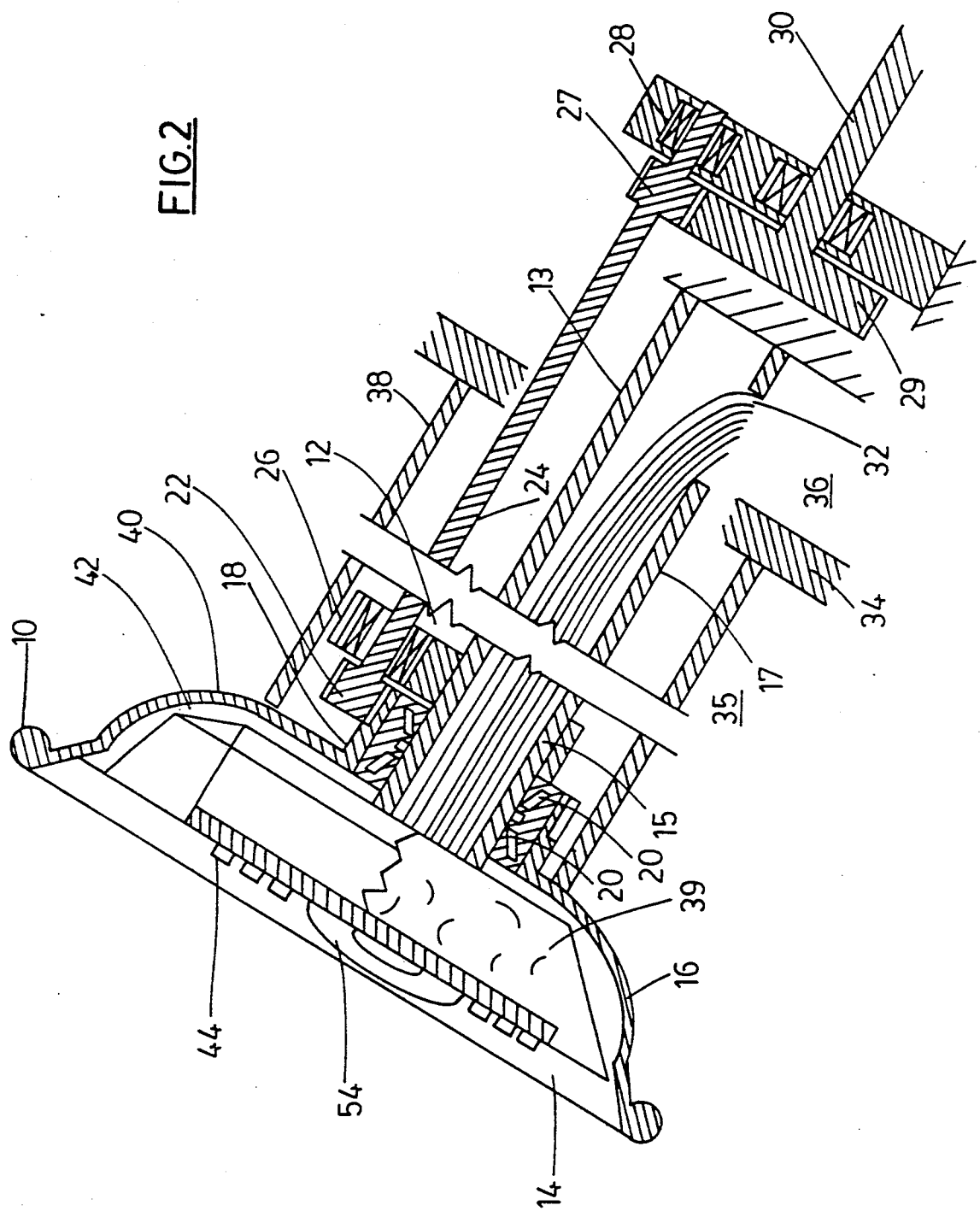
FIG. 2 a vertical cross-sectional view through a steering mechanism embodying the invention.
Figure 3:
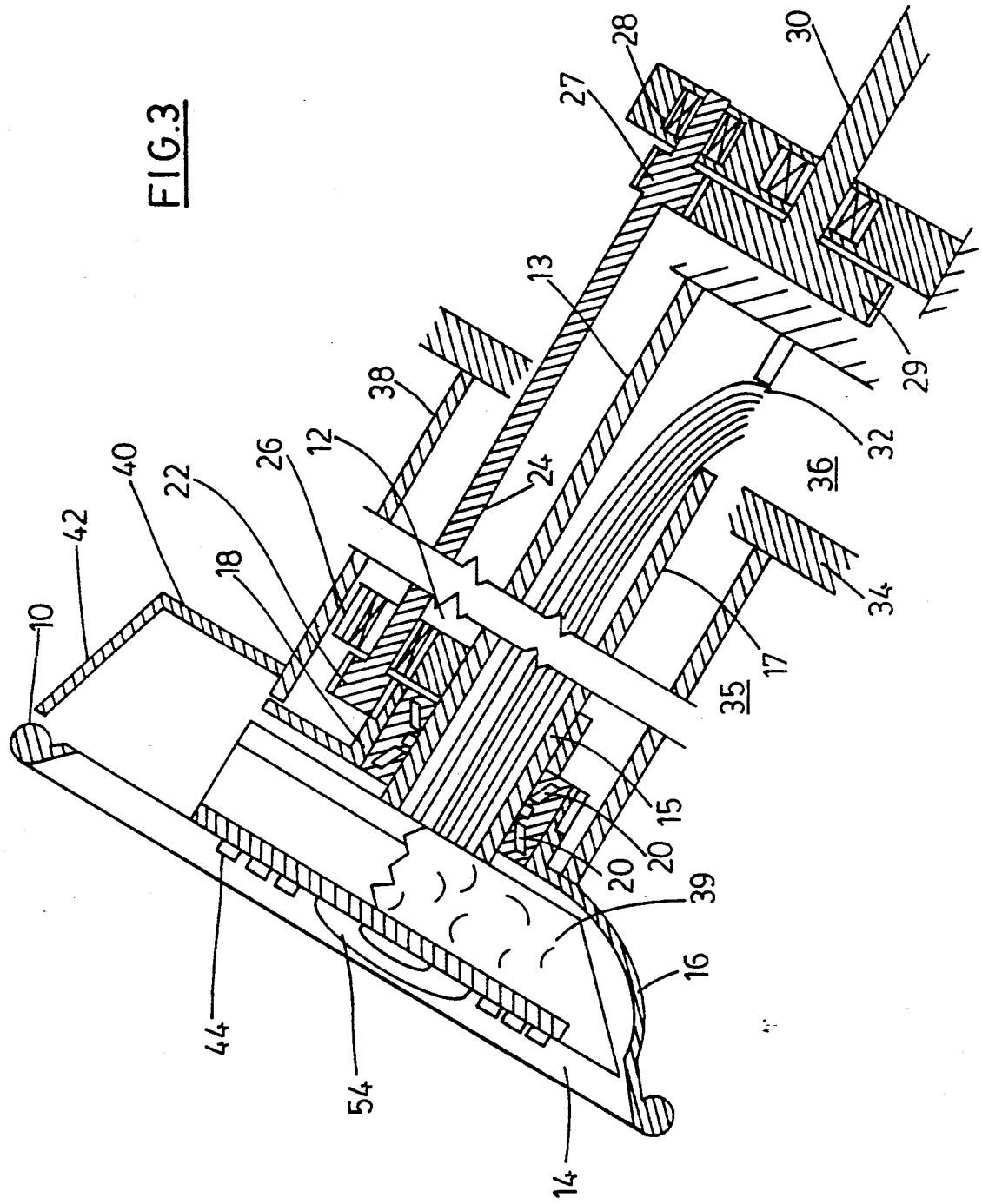
FIG. 3 is a vertical cross-sectional view through similar steering mechanism but having a display screen located on a housing of the steering column.
Figure 4:
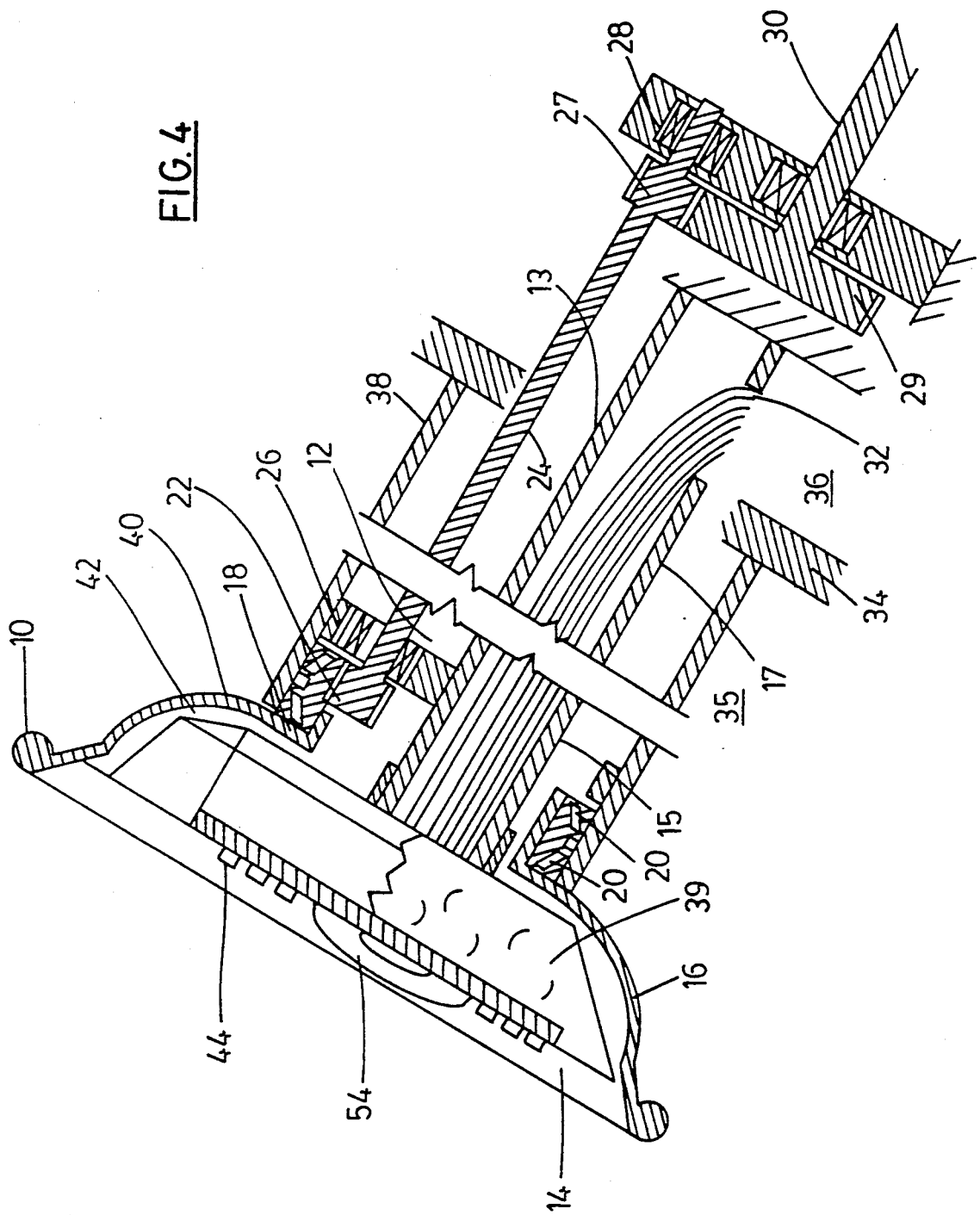
FIG. 4 is a vertical cross-sectional view through a different steering mechanism embodying the invention.

As shown in FIGS. 2, 3 and 4, a steering wheel 10 is rotatably journalled on a support shaft 12. The support shaft 12 may be fixed at a lower end 13 on any suitable part of the automobile and may carry the steering wheel at an upper end 15. The shaft 12 is hollow to carry a wiring truss 17 to a display panel 14 which is mounted at one end of the support column 12 to lie within the periphery of the steering wheel 10. Thus, wires from the display panel 14 lead continuously from the respective switch or display unit on the display panel to the respective controller/controlled unit with which they are associated. The display panel may be of various configurations possibly according to customer choice. However, whatever its front display configuration, its rear configuration will be fixed as a pattern of electrical connectors corresponding to mating connectors on the support member. Each connector will serve particular display member irrespective of the configuration of the display member insert.

The steering wheel may be of any convenient shape, but is conveniently circular and dished through a dish 16 which may be a continuous surface or comprise one or more spokes so that a front face of the display panel 14 is either flush with or slightly recessed from the plane of the steering wheel 10. The steering wheel 10 is provided with a hub 18 journalled onto support column 12 by bearings 20. An outer cylindrical surface of hub 18 is geared to mesh with corresponding gearing on an end 22 of an elongated offset link 24.

The end 22 may be enlarged with respect to the shaft to provide for good engagement with the gearing of the outer cylindrical surface of hub 18. The gearing between hub 18 and end 22 of shaft 24 may be of any suitable type, for example, toothed gearing, and will not be described in detail. The gearing may provide any desirable step up or step down between shaft 30 and steering wheel 10.

Link 24 is rotatable about its longitudinal axis in bearings 26, 28 carried by the support column 12 by rotation of the steering wheel 10 and hub 18 such that the gearing on the outer surface of the hub 18 meshes with the gearing on the end 22 of the link 24 to turn it. The bearings 26, 28 are conveniently carried on support column 12. The lower end 27 of steering shaft 24 may be similarly geared to a head 29 of a main steering shaft 30 coaxial with the support column 12 and hence with steering wheel 10. Again step up or step down gears may be used. By this means, an angle of turn of steering wheel 10 may provide a similar degree of turn in main steering shaft 30.

Steering mechanism according to the invention may be fitted as a replacement unit, into an automobile which has been designed for coaxial operation of steering wheel and steering shaft. However, in mechanical principle, it is not of importance whether the lower end 27 of link 24 is geared to the head 29 of drive shaft 30, or whether drive link 24 itself constitutes the steering shaft. In practice, however, it is of appreciable importance that the center of the steering wheel be aligned with its intending axis of rotation.

Since the support column 12 is stationary, the wiring truss 17 or parts of it may be led out of it at any convenient point. For example, as shown, the wiring truss may be led out of the support column 12 via port 32 forward of a dividing wall 34 between the driving compartment 35 and the engine compartment 36. Once in the engine compartment or other location such as one shielded from the driving compartment by the dashboard. The wiring truss 17 may be divided into smaller trusses or individual wires which may then be led in different directions to their destinations.

Figure 1:
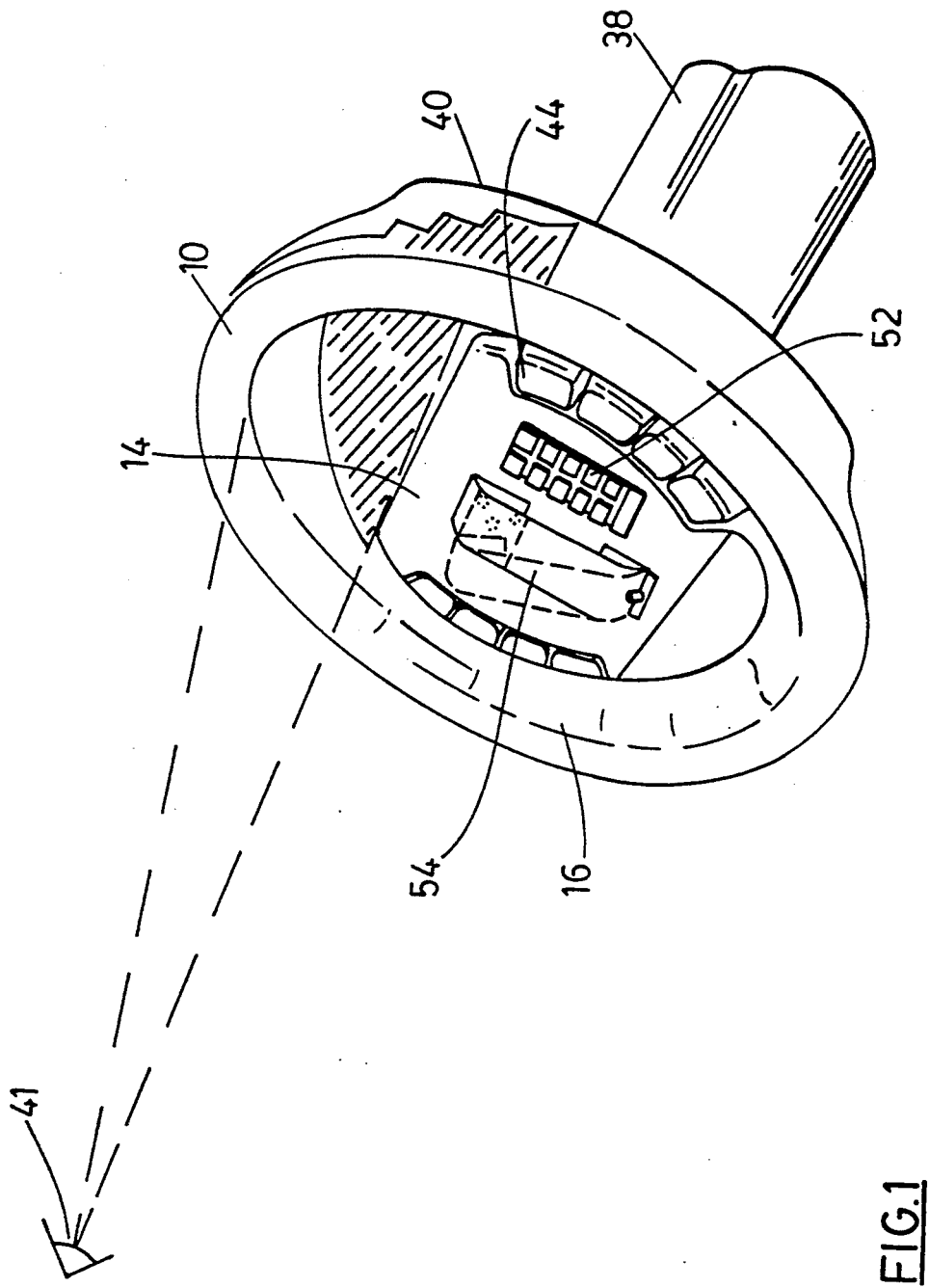
FIG. 1 is an illustration showing the line of sight of a driver both through a car windscreen and to a multi function steering mechanism embodying the invention.

At least within the driving compartment 35, it may be convenient to enclose the support column 12 and the drive shaft 12 within a housing 38. When the steering wheel 10 is journalled for rotation on support column 12, as shown in FIG. 2, there is no reason why housing 38 must be of circular cross-section. Indeed, it may be be as shown in FIG. 1 of almost pear-shaped cross-section with the link 24 located in the small end of the pear. At the lower end, the housing 38 may be connected with the dividing wall 34 between the driver compartment and the engine compartment. Alternatively, it may pass through the wall 34 and terminate at any convenient point. At its upper end, the housing 38 must terminate without fouling rotation of steering wheel 10. FIGS. 2, 3 and 4 show the upper end of housing 38 terminating abruptly just short of spokes 16 of wheel 10. However, any arrangement that does not foul the rotation of wheel 10 may be envisaged.

In particular, as shown in FIG. 4, an embodiment in which the rotation of wheel 10 is journalled on the housing instead of on the support column 12, and in this case, bearings 26, 28 may be carried on the housing 38. It is therefore possible to make support column 12 less robust since its only function is to house wiring truss 17 and to carry display panel 14. However, in this case, the housing 38 must be of circular cross-section, at least internally, for rotation of the hub 18.

Figure 5:
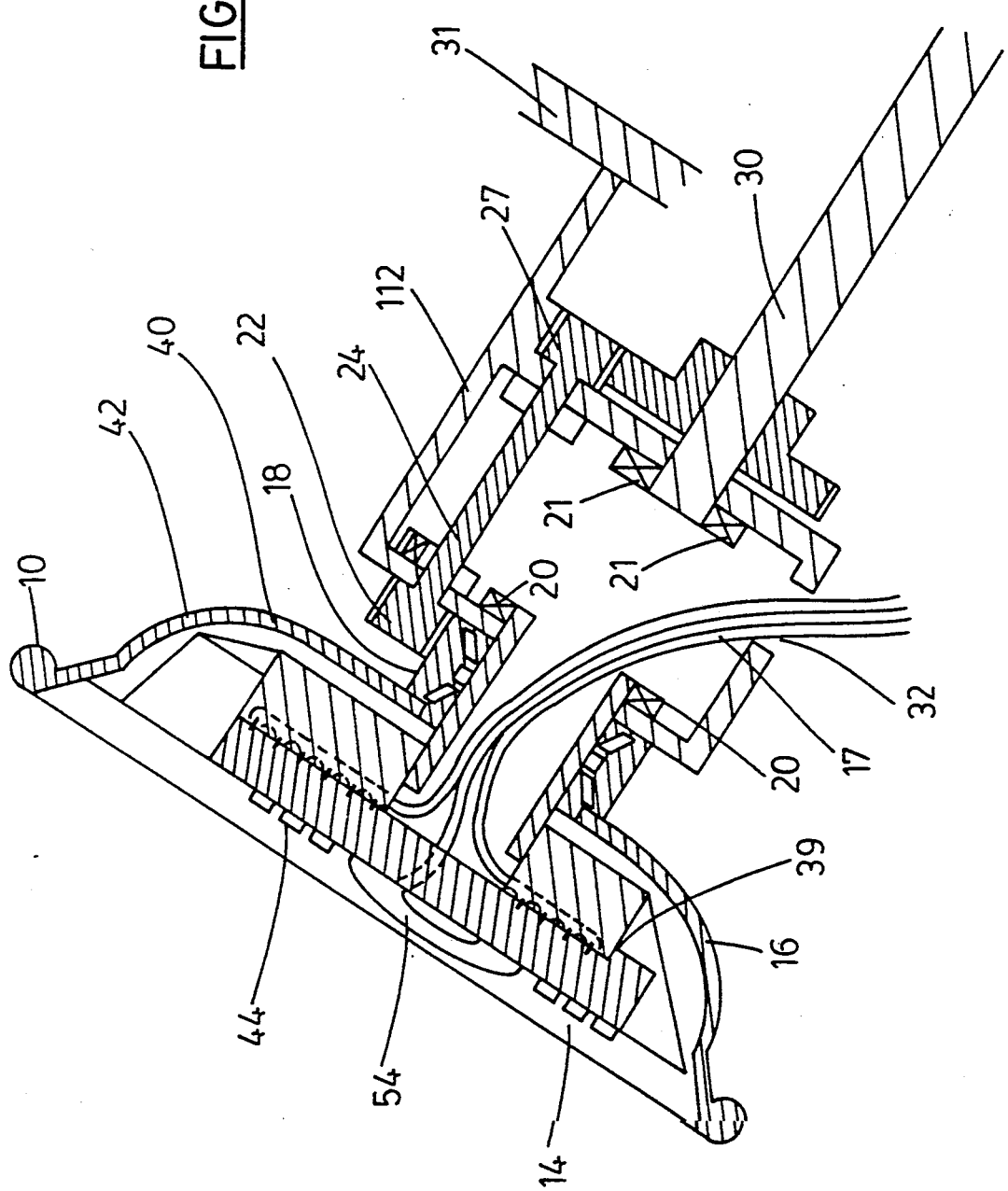
FIG. 5 is a cross-section of another embodiment showing potential as a replacement unit.

FIG. 5 shows a modified embodiment of the invention especially adapted for use as a replacement unit for conventionally fitted steering wheels. Where possible, the reference numerals used are the same as those used in connection with corresponding parts in the description relating to the other figures.

FIG. 5 shows a steering shaft 30 which extends well into the motor vehicle. Such a shaft 30 may originally have been fitted with a conventional steering wheel. As shown, however, any such wheel has been replaced by a replacement unit comprising a steering wheel 10, a support member 112 and an off set link 24.

The support member 112 may be narrow in the axial direction of steering shaft 30, being only sufficiently wide as to contain, on the one hand, bearings 20 for cylindrical steering wheel hub 18 which extends thereinto, and, on the other hand bearings 21 for steering shaft 30 which also extends thereinto. Wiring truss 17 passes through support member 112 exiting at port 32. Support member 112 for rotation of offset link 24.

As previously described offset link 24 has gearing at each end 22, 27 for meshing with gearing on the cylindrical hub 18 and steering shaft 30 respectively the manner of operation is generally similar to that already described. It is, however, to be noted that when the arrangement of FIG. 5 represents a replacement unit it may be convenient that any step up or step down gearing be between the cylindrical hub 18 and the link 24.

The display panel 14 may have a circular periphery and may take up effectively all the space within the periphery of steering wheel 10. However, it may be preferred that a portion of the space within the steering wheel 10 be left unobstructed for the location of a recessed screen 40, within the periphery of the steering wheel, and set back from it to be free of glare. Such screen is shown diagrammatically in FIG. 1 in line of sight with the driver's eye 41. In FIG. 1 and FIGS. 2 and 4, the screen is set in a top recess of display panel 14 towards the deepest part of dish of steering wheel 10. The forwardly projecting part of the dish which in this case is preferably a continuous surface, acts as the light shielding hood 42, so that light does not interfere badly with any display on the screen.

It may be provided with hood 42 to shield the screen from glare. Since not all drivers are of the same height, it will be necessary to provide adjustment means for screen 40 so that it is comfortably viewable for all drivers. Such as by providing means for tilting the steering wheel, adjustment means may be conventional, and do not themselves form part of the invention and will not be discussed in detail. It is appropriate to comment here that tilting of the steering wheel 10 for the embodiment of FIG. 2 may easily be accomplished by provision of coordinating tilt joints in both the support column 12 and the link 24.

It may be convenient that the hood 42 and screen 40 be carried by the steering column housing 38 by, for example, as shown in FIG. 3. Adjustment of the screen may be by adjustment means (not shown) between housing 38 and hood 42. In this case, the dish 16 of wheel 10 may preferably be a single spoke, located at the bottom of the wheel 10 in the straight steering position. Such a spoke is less likely to obscure the view of display screen 14 or turning the wheel 10. The screen 40 may be used for the display of information such as maps, directions and the like, the actual display being provided from a video tape or other display means.

The display panel 14 shown in FIG. 1 may conveniently have control switches 44 around its periphery so that they are within easy reach of the driver's fingers. Moreover, a car telephone may have a telephone instrument 54 hingedly mounted on the display panel as a speaker phone by hinges 55. In a "hung-up" position 55 for non-use, the instrument lies flat against the display panel 14. When it is desired for use, it may be hinged downwardly into position 59 shown in ghost lines in FIG. 1 to take it off the hook and be available to receive and transmit. A dialling pad 52 may be provided adjacent. Behind display panel 14 an air bag 39 may be tightly packed between the panel 14 and dish 16. A recess at the bottom of the display panel allows the inflating bag to flow into the driving compartment to act as a safety cushion in the event of a crash or sudden stop. Actuation of inflation or flow into the driver compartment may be either automatically activated by sudden deceleration or by manual actuation. However, it is to be understood that the illustration is in no way intended to limit the form of the display panel which may be designed in various forms depending on the information which is to be displayed and the control switches which are to be carried thereon.

I claim:

1. A multi function steering mechanism for a motor vehicle, including a display console, comprising:
   a non-rotatable, hollow support member carrying a rotatable steering wheel at one end and disengagably attachable with a steering shaft of the motor vehicle at the other end;
   the steering wheel being engagable with the steering shaft via an elongate link journalled in the hollow support member end located to be offset from the steering shaft when it is attached to the steering shaft, the link being operatively connected at one end to the steering wheel and being operatively engagable at another end to the steering shaft whereby the axis of rotation of the steering wheel is aligned with the steering shaft and rotation of the steering wheel acts to rotate the link and, hence, when connected, the steering shaft;
   a display panel non-rotatably connected to the support member having a front display face located within the periphery of the steering wheel;
   a wiring truss within the support member, individual wires of which wiring truss are directly connected to individual units of the display panel.

2. A multi function steering mechanism as claimed in claim 1 in which the offset link is rotatably supported on the support member.

3. A multi function steering mechanism as claimed in claim 2, in which the steering wheel is journalled for rotation on the support member.

4. A multi function steering mechanism as claimed in claim 3, in which the rotatable steering wheel includes a cylindrical hub, an inner surface of which is journalled on the support member for rotation.

5. A multi function steering mechanism as claimed in claim 4, in which the offset link comprises a tool having first gear means at one end meshing with the steering wheel gear means and second gear means at the other end meshing with steering shaft gear means.

6. A multi function steering wheel as claim ed in claim 5, in which the first gear means meshes with steering wheel gear means on the cylindrical hub.

7. A multi function steering mechanism as claimed in claim 1, in which the display panel includes a recessed display screen.

8. A multi function steering mechanism as claimed in claim 1, in which the display panel includes a recess in which an inflatable air bag is housed.

9. A multi function steering mechanism as claimed in claim 1, in which the display panel includes a speaker telephone hingably movable between an "on-hook" position and an "off-hook" position.

* * * * *